US009465419B2

(12) United States Patent
Marcato et al.

(10) Patent No.: US 9,465,419 B2
(45) Date of Patent: Oct. 11, 2016

(54) METHOD FOR LOCKING A WAKE-UP SIGNAL

(75) Inventors: Danilo Marcato, Pforzheim (DE); Binh-Tay Tran, Heilbronn (DE); Gaetano Manca, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 2167 days.

(21) Appl. No.: 11/241,273

(22) Filed: Sep. 29, 2005

(65) Prior Publication Data
US 2006/0065751 A1 Mar. 30, 2006

(30) Foreign Application Priority Data

Sep. 29, 2004 (DE) .................. 10 2004 047 181

(51) Int. Cl.
| F25D 23/12 | (2006.01) |
| G05D 23/32 | (2006.01) |
| F02B 77/08 | (2006.01) |
| F02D 17/00 | (2006.01) |
| F02M 17/30 | (2006.01) |
| F01P 5/14 | (2006.01) |
| F23N 5/20 | (2006.01) |
| G05D 23/00 | (2006.01) |
| H03K 17/14 | (2006.01) |
| H03K 17/687 | (2006.01) |
| B60R 25/10 | (2013.01) |
| B60Q 1/00 | (2006.01) |
| G06F 1/24 | (2006.01) |
| G06F 1/26 | (2006.01) |

(52) U.S. Cl.
CPC .. *G06F 1/24* (2013.01); *G06F 1/26* (2013.01)

(58) Field of Classification Search
CPC ............ F01P 2031/00; F01P 2031/30; F01P 2037/02; F02D 41/22; Y02T 10/40; Y02T 10/48; B60H 1/00735

USPC .......... 340/449, 426.25, 426.24; 123/198 D, 123/41.15; 62/259.2, 157; 236/46 R; 327/378, 427
See application file for complete search history.

(56) References Cited

U.S. PATENT DOCUMENTS

| 3,237,156 | A | * | 2/1966 | Anderson .................. 340/901 |
| 3,575,617 | A | * | 4/1971 | Burns ......................... 327/210 |
| 4,264,035 | A | * | 4/1981 | Maxson ............... G05D 23/185 |
| | | | | 236/49.4 |
| 4,419,730 | A | * | 12/1983 | Ito et al. ........................ 701/36 |
| 4,499,733 | A | * | 2/1985 | Farr et al. ...................... 60/611 |
| 4,532,606 | A | * | 7/1985 | Phelps ....................... 365/49.11 |
| 5,081,443 | A | | 1/1992 | Breit |
| 5,107,246 | A | * | 4/1992 | Mogaki ........................ 340/449 |
| 5,523,714 | A | * | 6/1996 | Topp et al. ................... 327/427 |
| 6,119,950 | A | * | 9/2000 | Albanello et al. .......... 236/46 R |
| 6,131,539 | A | * | 10/2000 | Thomas .................... 123/41.15 |
| 6,415,761 | B1 | * | 7/2002 | McKenzie ............... 123/198 D |
| 6,604,909 | B2 | * | 8/2003 | Schoenmeyr .................. 417/32 |
| 6,802,291 | B2 | * | 10/2004 | Ujifusa ........................ 123/179.4 |
| 6,986,331 | B2 | * | 1/2006 | Mizutani .................. 123/179.15 |
| 7,072,761 | B2 | * | 7/2006 | Hawkins et al. ............. 701/112 |
| 2002/0141874 | A1 | | 10/2002 | Schoenmeyr |

FOREIGN PATENT DOCUMENTS

| DE | 37 18 471 | 12/1988 |
| DE | 101 57 802 | 6/2003 |
| JP | 4-98508 | 3/1992 |
| JP | 2003-214246 | 7/2003 |

* cited by examiner

*Primary Examiner* — Allen Flanigan
*Assistant Examiner* — Filip Zec
(74) *Attorney, Agent, or Firm* — Norton Rose Fulbright US LLP

(57) ABSTRACT

A method for locking a control device, the control device to be wakened by a wake-up signal, in which the wake-up signal is blocked by an excess-temperature circuit.

14 Claims, 2 Drawing Sheets

METHOD FOR LOCKING A WAKE-UP SIGNAL

FIELD OF THE INVENTION

The present invention relates to a method for locking a wake-up signal, an excess-temperature circuit, a computer program, and a computer program product.

BACKGROUND INFORMATION

A method of functioning of a control device may be influenced by its temperature or by the temperature of the environment in which the control device is located. Temperature-related damage to the control device may be prevented by avoiding an activation of the control device outside a predefined temperature range.

SUMMARY OF THE INVENTION

The method according to the present invention is used to lock a control device to be reactivated by a wake-up signal, the wake-up signal being blocked by an excess-temperature circuit.

The control device can be awakened only by the wake-up signal and assume its operation so as to carry out control functions, for instance to control one or a plurality of other devices.

In one development, a one-time blocking of the wake-up signal may be provided. If the wake-up signal is blocked by the excess-temperature shutdown, i.e., blocked on the hardware side, waking of the control device will be suppressed so that a reactivation of the control device is impossible.

The excess temperature shutdown, which may be implemented as hardware-side blocking electronics, may be controlled by suitable software or a suitable program, a blocking of the wake-up signal being triggered by this software or by this program.

When executing this method, it may be provided that the wake-up signal be blocked above a critical temperature or a shutdown temperature. This prevents waking of the control device above this temperature. As an alternative, the wake-up signal may be blocked below a critical temperature, within a temperature range or outside a temperature range.

The method is preferably implemented taking a temperature of the control device into account. If the temperature of the control device is above the critical temperature or when it reaches a value above this critical temperature, the wake-up signal for the control device will be blocked by the excess-temperature circuit.

It is also possible to implement the method taking a temperature of at least one other device into account, or to implement the method as a function thereof. This device may interact directly or indirectly with the control device and, for instance, be under the control of the control device. If the temperature of this device is above the critical temperature or if it should reach this critical temperature, the excess-temperature circuit will block the wake-up signal on a permanent basis.

The control device is usually accommodated in a technical device such as a vehicle.

The method may be implemented in a start-up of the control device initiated by a starting device, usually with the aid of an ignition key. The waking of the control device for the assumption of control functions can be initiated only if the wake-up signal is able to reach the control device and is thus not blocked. However, if the wake-up signal is blocked or locked by a shutdown at a temperature that is greater than or equal to the critical temperature, the control device is unable to be awakened during the start. The control device can always be awakened with the aid of the ignition key, via a first path. Here, the locking by the excess-temperature circuit relates to a second path such as a CAN (controller area network), which is provided for waking the control device. The present invention provides for the permanent blocking of only one of these two paths.

It may be provided that the method triggers a permanent blocking of the wake-up signal on a one-time basis by the excess temperature. In doing so, the one-time blocking triggered by the excess-temperature circuit will not be reversed by a drop in the temperature—either the temperature of the control device and/or the device—to below the critical temperature. Accordingly, the excess-temperature circuit blocks the wake-up signal permanently. The excess-temperature circuit thus permanently locks reactivation of the control device by the wake-up signal that is provided via the signal path such as a CAN (controller area network) as soon as the excess-temperature circuit has triggered the one-time blocking upon reaching the critical temperature.

The blocking or the so-called permanent blocking of the wake-up signal may be reset in a start-up of the control device initiated by the starting device. This is the case, for instance, when the temperature is below the critical temperature. The wake-up signal is then able to reach the control device again during the start.

In a development of the present method, the wake-up signal is blocked by a transistor in the excess-temperature circuit. To this end the transistor may be integrated in the signal path in such a way that the transistor diverts the wake-up signal provided for the control device from the signal path. This is implemented as a function of the temperature, the transistor being able to be influenced by, for example, a temperature-sensitive component. The transistor may be switched by a bistable element of the excess-temperature circuit. In this case, a signal path between the control device and another electronic device via which the wake-up signal is to be transmitted is blocked by the transistor, so that the wake-up signal transmitted from the additional device will not reach the control device. The excess-temperature circuit also may be arranged inside a/the control device.

The bistable element for switching the transistor changes its states as a function of the temperature of the control device and/or the device, and is able to change its state under the influence of the temperature-sensitive component.

The excess-temperature circuit for a control device according to the present invention is designed to block a wake-up signal by which the control device is to be reactivated.

The excess-temperature circuit may be designed as locking electronics and is actuated with the aid of software upon reaching the critical temperature, so that a hardware-side locking of the control device, triggered by the software, is realized by the excess temperature circuit. The excess-temperature circuit may be accommodated in the control device, for example.

The excess-temperature circuit, or at least a temperature-sensitive component of the excess-temperature circuit, may have a temperature profile that corresponds at least to a maximum temperature profile of the control device. Accordingly, the excess-temperature circuit or the temperature-sensitive component may have characteristics of a temperature sensor. A temperature characteristic curve or the temperature profile of the excess-temperature circuit or of the component is adapted to a temperature characteristic curve or the temperature profile of the control device or the device, in such a way that the excess-temperature circuit is able to respond to temperature changes of the control device in a reliable manner and will block the wake-up signal for the control device as soon as the temperature is above the critical temperature.

The excess-temperature circuit may have a bistable element, for instance a flip-flop, and a transistor, the bistable element changing its states as a function of a value of a temperature, possibly influenced by the temperature-sensitive component, thereby switching the transistor. The temperature-sensitive component also may be designed in such a way that it switches the transistor directly, so that no bistable element will be required.

The computer program having program-code means according to the present invention is provided to implement all steps of the method according to the present invention when the computer program is executed on a computer or a corresponding computing unit.

The computer-program product according to the present invention includes program-code means that are stored on a computer-readable data carrier so as to execute the method according to the present invention when the computer program is implemented on a computer or a corresponding computing unit.

DETAILED DESCRIPTION

Figure 1:
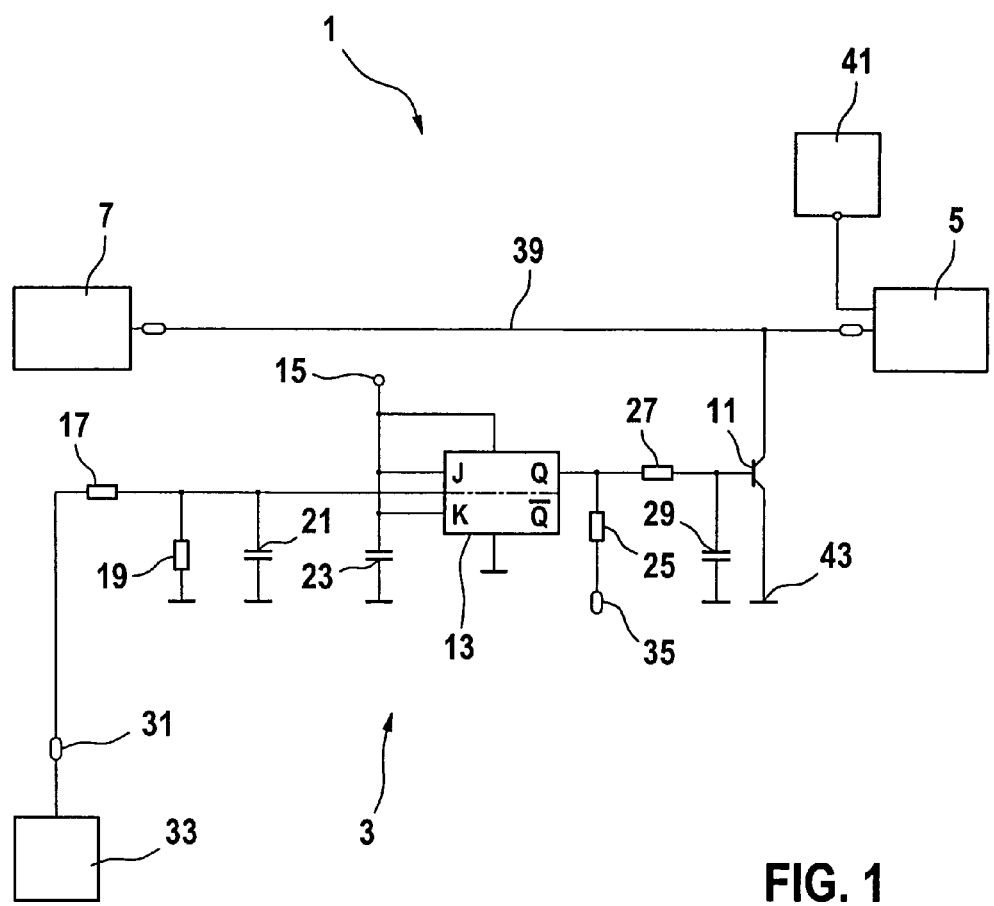
FIG. 1 shows a schematic representation of an excess-temperature circuit, a control device and an additional electronic device.

FIG. 1, by way of a schematic illustration, shows a control device 1 having an excess-temperature circuit 3, a control device 5 and an electronic device 7. Excess-temperature circuit 3 has a transistor 11 such as a T100, a bistable element 13 designed as J-K-Flip-flop, a connection to a voltage source 15, as well as various resistors and capacitors.

These may be an electrical resistor 17, for instance an R110 having a resistance value of 100 kΩ, an electrical resistor 19 such as an R111 having a resistance value of 1 MΩ, a capacitor 21, for instance a C110 having a capacitance of 10 nF, a capacitor 23 such as a C101 having a capacitance of 10 nF, an electrical resistor 25, for instance an R101 having a resistance value of 100 kΩ, an electrical resistor 27, for instance an R100 having a resistance value of 100 kΩ, and a capacitor 29 such as a C100 having a capacitance of 10 nF.

Excess-temperature circuit 3 has a first output 31 via which excess-temperature circuit 3 is connected to a temperature-sensitive component 33. In addition, excess-temperature circuit 3 has an analog-digital output 35.

Control device 5 and electrical device 7, which are arranged inside control device 1, are interconnected via a signal path 39. Furthermore, this control device 5 is connected to a starting device 41 such as an ignition key, for example. Transistor 11 is integrated in signal path 39 between control device 5 and electrical device 7 in such a way that it diverts to ground 43 a signal to be transmitted via signal path 39 as a function of the way it is switched, thus blocking the signal or releasing signal path 39 so that the signal arrives at control device 5.

Starting device 41 is designed to reset or start control device 5. If transistor 11 is blocked, a wake-up signal generated by electrical device 7 may be transmitted to control device 5 via signal path 39. The wake-up signal allows waking of control device 5.

Excess-temperature circuit 3 is designed to block the wake-up signal as a function of the temperature and thus to lock control device 5. In this context it is provided that the wake-up signal be blocked taking a temperature of control device 5 into account. The temperature of control device 5 is detected by temperature-sensitive component 33 which has a temperature profile that corresponds to at least a maximum temperature profile of control device 5. This means that component 33 is able to reliably distinguish whether the temperature of control device 5 is above or below the critical temperature or is equal to this critical temperature. To this end, the temperature profile of component 33, and thus a temperature profile of excess-temperature circuit 3 as well, may be especially sensitive in the range of the critical temperature of control device 5, for instance.

Figure 2:
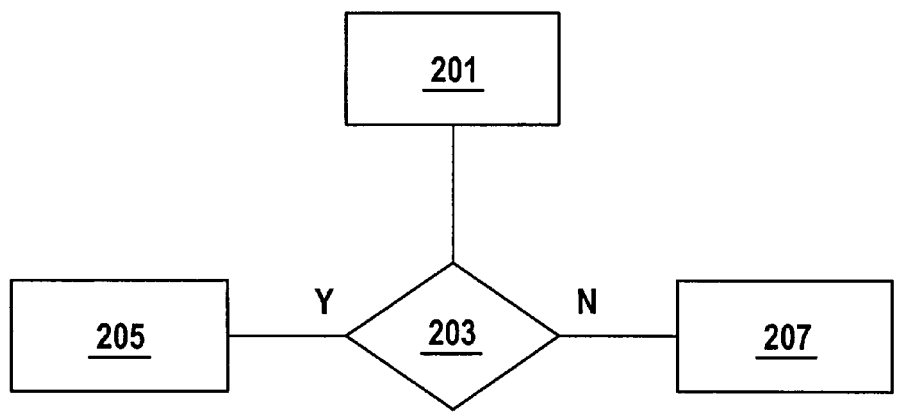
FIG. 2 clarifies a method for locking a control device on the basis of a flow chart.

In the example at hand, temperature-sensitive component 33 influences the two possible positions of bistable element 13 as a function of the temperature of control device 5. Possibilities for a function of control device 5 arising in this context are illustrated by method steps 201, 203, 205, 207 of the flow chart shown in FIG. 2.

On the basis of an initial start 201 a software-controlled check 203 takes place. A first state 205 (Q=0) of bistable element 13 occurs when the temperature of control device 5 is below the critical temperature. In this case bistable element 13 switches transistor 11 in such a way that transistor 11 releases a path of the wake-up signal along signal path 39 and the wake-up signal reaches control device 5, thereby allowing control device 5 to be reactivated.

In those instances where the temperature of control device 5 is greater than or equal to the critical temperature, bistable element 13 assumes a second state (Q=1) 207 under the influence of component 33. In such a case, bistable element 13 switches transistor 11 in such a way that the wake-up signal will be blocked. Since the wake-up signal will not reach control device 5 under these circumstances, control device 5 is locked and unable to be reactivated via signal path 39.

Different switch-on conditions may come about in the arrangement at hand. During initial start 201, a voltage U_STBY is applied at voltage source 15 for the first time. This causes bistable element 13 to tilt into preferred state (Q=0) 205 due to a constant supply of voltage U_STBY. In this case the temperature of control device 5 is lower than the critical temperature. Transistor 11 is blocked by bistable element 13. This releases signal path 39 and thereby allows waking of control device 5 by the wake-up signal transmitted via signal path 39 and originating from electronic device 7. The status of transistor 11 can be read with the aid of software via analog-digital output 35.

If a so-called fault case occurs, the temperature of control device 5 is above the critical temperature. As a result, bistable element 13, influenced by component 33, assumes state (Q=1) 207. This causes transistor 11 to be switched in such a way that it is conductive, so that the wake-up signal is shunted from signal path 39 toward ground 43 and thus blocks the wake-up signal for control device 5, control device 5 thus being locked. Control device 5 is unable to be reactivated by the wake-up signal. In both cases a reactivation of control device 5 independently of a temperature of control device 5 is possible with the aid of starting device 41.

During a first-time activation of starting device 41, control device 5 will be reactivated. The status of transistor 11 may be queried via analog-digital input 35. If, after a period during which it was above this critical temperature or had been equal to this critical temperature, the temperature of control device 5 is lower than the critical temperature, the software is able to toggle, i.e., switch back and forth, via input 31 and set a desired state for bistable element 13.

In the event that the temperature of control device 5 is still greater than or equal to the critical temperature, the software is able to toggle via input 31 and set bistable element 13 in such a way that transistor 11 diverts the wake-up signal, and control device 5 is locked or remains locked. In the process, transistor 11 is set to the corresponding state by bistable element 13 and remains supplied with voltage U_STBY via voltage source 15. Waking of control device 5 by electronic device 7 is thus not possible.

If waking of control device 5 is provided, it must be reset, and thus awakened, via starting device 41, but this will always be followed by a check via the software. Due to the design and method of functioning of excess-temperature circuit 3 it is therefore impossible to wake control device 5 if the temperature of control device 5 is greater than or equal to the critical temperature.

Entire arrangement 1 may be located in a vehicle. Locking of control device 5 by blocking the wake-up signal may also occur as a function of another device such as a transmission of the vehicle, and thus may be carried out independently of the temperature of control device 5. The temperature of 150°, for instance, maximally allowed for the method of functioning of the transmission, may be selected as critical temperature. As a result, the waking of the control device will be prevented above this temperature in the transmission. In such an application starting device 41 may be an ignition lock of the vehicle to be actuated by an ignition key (KI. 15). Resetting of control device 5 is possible with the aid of a corresponding signal of the ignition lock.

Control device 5 for a transmission is able to be reactivated within a CAN interconnection or within control device 1 via one or a plurality of signal paths 39.

However, an impermissible operation of control device 5 following an initiated reactivation outside critical operating parameters—in the case at hand, above the critical temperatures—is not possible. The locking of control device 5 by excess-temperature circuit 3 blocking the wake-up signal is implemented on the hardware side. As an alternative, excess-temperature circuit 3 may also be accommodated inside control device 5, which may be designed as a Stabi-ASIC, so that it is possible to achieve an optimum ratio of silicon area to ceramic area inside control device 5 in this type of design. The use of excess-temperature circuit 3 in a so-called LIN wake-up is conceivable as well.

What is claimed is:

1. A method for locking a control device to be wakened by a wake up signal, the method comprising:
    applying a voltage to a bistable element;
    detecting a temperature of the control device by a temperature-sensitive component;
    wherein if, during an initial start, the temperature of the control device is lower than a critical temperature, switching the bistable element to block a transistor so that the wake-up signal is not shunted by the transistor from the signal path to ground and thereby allow waking of the control device by the wake-up signal transmitted via the signal path, and
    wherein if, during a fault, the temperature of the control device is above the critical temperature, switching the bistable element so that the transistor is conductive, so that the wake-up signal is shunted by the transistor from the signal path to ground to block the wake-up signal.

2. The method according to claim 1, wherein the blocking of the wake up signal is triggered by software, and the wake up signal is blocked on a hardware side.

3. The method according to claim 1, further comprising:
    after a period during which the temperature of the control device was above the critical temperature, if the temperature of the control device is lower than the critical temperature, setting a desired state for the bistable element.

4. The method according to claim 3, further comprising:
    reactivating the control device independent of the temperature of the control device with the aid of a starting device.

5. The method according to claim 1, further comprising:
    reactivating the control device independent of the temperature of the control device with the aid of a starting device.

6. The method according to claim 1, wherein the temperature-sensitive component has a temperature profile that corresponds to at least a maximum temperature profile of the control device.

7. An excess-temperature circuit for blocking a wake-up signal transmitted via a signal path to a control device, comprising:
    a transistor coupled to the signal path;
    a temperature-sensitive component; and
    a bistable element providing an output;
    wherein the output of the bistable element changes as a function of a temperature value detected by the temperature-sensitive component,
    wherein the bistable element is coupled to the transistor to modify a conductivity of the transistor according to the output the bistable element,
    wherein if, during an initial start, the temperature of the control device is lower than a critical temperature, switching the bistable element to block a transistor so that the wake-up signal is not shunted by the transistor from the signal path to ground and thereby allow waking of the control device by the wake-up signal transmitted via the signal path, and
    wherein if, during a fault, the temperature of the control device is above the critical temperature, switching the bistable element so that the transistor is conductive, so that the wake-up signal is shunted by the transistor from the signal path to ground to block the wake-up signal.

8. The excess-temperature circuit according to claim 7, wherein the temperature-sensitive component has a temperature profile that corresponds to at least a maximum temperature profile of the control device.

9. The excess-temperature circuit according to claim 8, wherein the blocking of the wake up signal is triggered by software, and wherein the wake up signal is blocked on a hardware side.

10. A non-transitory computer readable medium having a computer program, which is executable by a processor, comprising:

a program code arrangement having program code for locking a control device to be wakened by a wake up signal by performing the following:
applying a voltage to a bistable element;
detecting a temperature of the control device by a temperature-sensitive component;
wherein if, during an initial start, the temperature of the control device is lower than a critical temperature, switching the bistable element to block a transistor so that the wake-up signal is not shunted by the transistor from the signal path to ground and thereby allow waking of the control device by the wake-up signal transmitted via the signal path, and
wherein if, during a fault, the temperature of the control device is above the critical temperature, switching the bistable element so that the transistor is conductive, so that the wake-up signal is shunted by the transistor from the signal path to ground to block the wake-up signal.

11. The computer readable medium according to claim 10, wherein the temperature-sensitive component has a temperature profile that corresponds to at least a maximum temperature profile of the control device.

12. The computer readable medium according to claim 10, further comprising:
after a period during which the temperature of the control device was above the critical temperature, if the temperature of the control device is lower than the critical temperature, setting a desired state for the bistable element.

13. The computer readable medium according to claim 12, further comprising:
reactivating the control device independent of the temperature of the control device with the aid of a starting device.

14. The computer readable medium according to claim 10, further comprising:
reactivating the control device independent of the temperature of the control device with the aid of a starting device.

* * * * *